US008872435B2

(12) United States Patent
Kreitzer et al.

(10) Patent No.: US 8,872,435 B2
(45) Date of Patent: Oct. 28, 2014

(54) LED LIGHT FOR EXAMINATIONS AND PROCEDURES

(75) Inventors: Melvyn H. Kreitzer, Cincinnati, OH (US); Kevin M. Montgomery, Cincinnati, OH (US); Jacob Moskovich, Cincinnati, OH (US); Brian D. Rau, Cincinnati, OH (US); Thomas L. Treon, Versailles, OH (US)

(73) Assignee: Midmark Corporation, Versailles, OH (US)

(*) Notice: Subject to any disclaimer, the term of this patent is extended or adjusted under 35 U.S.C. 154(b) by 153 days.

(21) Appl. No.: 13/579,436

(22) PCT Filed: Feb. 15, 2011

(86) PCT No.: PCT/US2011/024850

§ 371 (c)(1), (2), (4) Date: Aug. 16, 2012

(87) PCT Pub. No.: WO2011/103073

PCT Pub. Date: Aug. 25, 2011

(65) Prior Publication Data

US 2013/0069549 A1 Mar. 21, 2013

Related U.S. Application Data

(60) Provisional application No. 61/304,848, filed on Feb. 16, 2010.

(51) Int. Cl.

| | |
|---|---|
| ***H05B 37/02*** | (2006.01) |
| ***F21S 6/00*** | (2006.01) |

(Continued)

(52) U.S. Cl.

CPC ............... *F21V 14/06* (2013.01); *F21V 7/0091* (2013.01); *F21S 6/003* (2013.01); *F21V 17/02* (2013.01); *H05B 33/0854* (2013.01); *F21Y 2101/02* (2013.01); *F21V 21/32* (2013.01); *F21V 23/04* (2013.01); *F21W 2131/20* (2013.01); *F21V 23/0457* (2013.01); *F21V 5/008* (2013.01); *F21V 23/0442* (2013.01); *G02B 15/14* (2013.01); *H05B 37/02* (2013.01); *F21V 5/04* (2013.01)

USPC ....................................... 315/200 R; 315/291

(58) Field of Classification Search

None

See application file for complete search history.

(56) References Cited

U.S. PATENT DOCUMENTS 5,658,062 A * 8/1997 Lee et al. ........................ 353/85
6,808,289 B2 * 10/2004 Reed ............................ 362/198

(Continued)

FOREIGN PATENT DOCUMENTS

WO 2010/007504 A1 1/2010

OTHER PUBLICATIONS

U.S. Patent and Trademark Office; Preliminary Examination Report in International Patent Application No. PCT/US2011/024850 dated Aug. 21, 2012; 5 pages.

(Continued)

*Primary Examiner* — Crystal L Hammond

(74) *Attorney, Agent, or Firm* — Frost Brown Todd LLC

(57) ABSTRACT

A light is provided having a base unit, an arm extending from the base unit, and a lamp head coupled to the arm. The lamp head includes an LED configured to provide light based on an input drive current, an optical mixing element configured to collect the light produced by the LED and a zoom lens configured to adjust an output size of a spot generated by the light collected in the mixing element. A controller receives DC power from the base unit through the arm. The controller is configured to set the input drive current for the LED to control an output light density of the spot in response to an operator selected input and configured to adjust the output light density of the spot in response to a change in the size of the spot.

19 Claims, 11 Drawing Sheets

(51) Int. Cl.

| | |
|---|---|
| ***F21V 17/02*** | (2006.01) |
| ***H05B 33/08*** | (2006.01) |
| ***F21V 21/32*** | (2006.01) |
| ***F21V 23/04*** | (2006.01) |
| ***F21V 14/06*** | (2006.01) |
| ***F21V 5/00*** | (2006.01) |
| ***G02B 15/14*** | (2006.01) |
| *F21V 7/00* | (2006.01) |
| *F21Y 101/02* | (2006.01) |
| *F21W 131/20* | (2006.01) |
| *F21V 5/04* | (2006.01) |

(56) References Cited

U.S. PATENT DOCUMENTS

| | | | | |
|---|---|---|---|---|
| 7,261,438 | B2 * | 8/2007 | Alessio | 362/268 |
| 7,618,175 | B1 | 11/2009 | Hulse | |
| 7,845,559 | B2 * | 12/2010 | Kotlarsky et al. | 235/462.07 |

OTHER PUBLICATIONS

U.S. Patent and Trademark Office; Search Report and Written Opinion in International Patent Application No. PCT/US2011/024850 dated Apr. 19, 2011; 7 pages.

* cited by examiner

LED LIGHT FOR EXAMINATIONS AND PROCEDURES

CROSS REFERENCE

This application is a submission under 35 U.S.C. §371 of International Patent Application No. PCT/US2011/024850 filed Feb. 15, 2011 (pending), which claims priority to U.S. Provisional Patent Application Ser. No. 61/304,848, filed Feb. 16, 2010, the disclosures of which are incorporated by reference herein in their entirety.

FIELD OF THE INVENTION

This application relates generally to the field of illumination, and more particularly to an LED illumination device for use by a physician or health care provider.

BACKGROUND OF THE INVENTION

Health care providers, during examinations and procedures, need additional lighting to better diagnose and treat different health conditions. It is important for lighting to have proper intensity, color temperature, and uniformity so that the provider is not mislead when making a diagnosis during the examination or procedure. The examination light may be used in multiple types of examinations and procedures; therefore, it is important for the design of the light to allow for the proper reach and positioning in order to illuminate any part of the body by the health care professional. It is equally important that once positioned, the light does not drift from this location, which can cause inconvenience especially when working in a sterile field. Examination lights with smaller product profiles are desirable as they assist in giving the provider better access to the patient.

Contemporary examination lights are generally not designed specifically for interaction with examination and procedure chairs and tables, limiting their effectiveness when used as a system. The contemporary exam lights are typically caster based, wall mounted, or ceiling mounted making them cumbersome for users and in some cases preventing accessibility to a patient. In other cases, these lights may assist in increasing room clutter.

Contemporary examination lights generally use halogen bulbs and fiber optic bundles that produce intense amounts of heat. Because of the halogen bulb, some lights require larger product envelopes. Furthermore, the halogen bulbs utilized in the contemporary lights generally offer only hundreds to a few thousand hours of life. Blown bulbs may be costly and inconvenient especially if the failure of the bulb occurs in the middle of an examination or procedure. Moreover, as these light sources are manipulated to adjust a spot size of the light, the spots generally lose intensity as the spot size is increased, having health care professionals choose between more intense light or a larger spot of light. Therefore there is a need in the art to improve the life of the light source without degrading light intensity would be a noticeable improvement.

Some examinations and procedures may be hours in duration. Heat generated from contemporary lamps can become uncomfortable for both the provider and patient. Some contemporary lamps attempt to place the light source in the base of the light, away from the provider and the patient, but these configurations then require transmitting the light from the base of the light to the lamp head as well as fans or other heat dissipation components which are a source of noise and add cost to the overall system. Therefore there is also a need in the art for a light that does not produce an abundance of heat over long periods of time.

Additionally, since it is likely the examination light could come into contact with different substances during the examination or procedure, the design of the light should provide some protection against the ingress of fluids. This also helps to ensure satisfactory operation of the light when cleaned with different disinfectants.

SUMMARY OF THE INVENTION

Embodiments of the invention not only focus on designing an examination light, but are also focused on the interaction between a user and the light. Embodiments of the examination light provide mounting locations that allow proper reach of the light source, provide a home storage position, and assist in reducing floor clutter by attaching the light to an examination chair or examination table. Mounting directly to the examination chair or table allows for maximum accessibility to the patient and may aesthetically blend in with the chair or table, which also may assist in making the exam and procedure rooms more inviting to a patient.

In some embodiments, the location of the power switch is on the light head. This location may assist in eliminating the need for the user to reach away from the light head, which may be uncomfortable for the provider and patient. A recessed location of the power switch, in some embodiments, may make it easy to locate and may assist in preventing accidental activation of the switch.

The optical system, in some embodiments, allows light intensity and uniformity to be met in a very short distance while using a LED as the light source, thus avoiding some of the issues related to contemporary halogen bulb lights. This short distance allows for a smaller light head, which adds to the ergonomics of the design and assists in positioning the light without obstructing the view of the healthcare provider. The LED light source produces a light beam that generally does not generate heat at the illumination site. Additionally, a predicted life for the LED is approximately a 50,000 hour life versus a few thousands of hours of their counterpart halogen bulbs.

Embodiments may also include a controller which is configured to drive more current through the LED effectively generating more foot-candles or lux as the spot size diameter is increased. This may assist in offsetting any loss in light intensity allowing for a system that can maintain intensity throughout the spot size range. A healthcare provider may now be able to increase the spot size without suffering a loss of light intensity.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention provide an examination light that delivers lighting with proper intensity, color temperature and uniformity to assist in enabling a medical provider in providing proper diagnoses. Embodiments allow the light to be used in multiple types of examinations and procedures by providing an adequate reach and positioning to assist in illuminating any part of the body without drifting from its location. Embodiments of the invention also allow for the ability to adjust the spot size from a minimum range to a maximum range assisting the provider in being able to direct light only where needed. Additionally, embodiments of the invention also provide an auto-intensity functionality, driving more light to an increased spot size, assisting in minimizing intensity roll-off.

Figure 1:
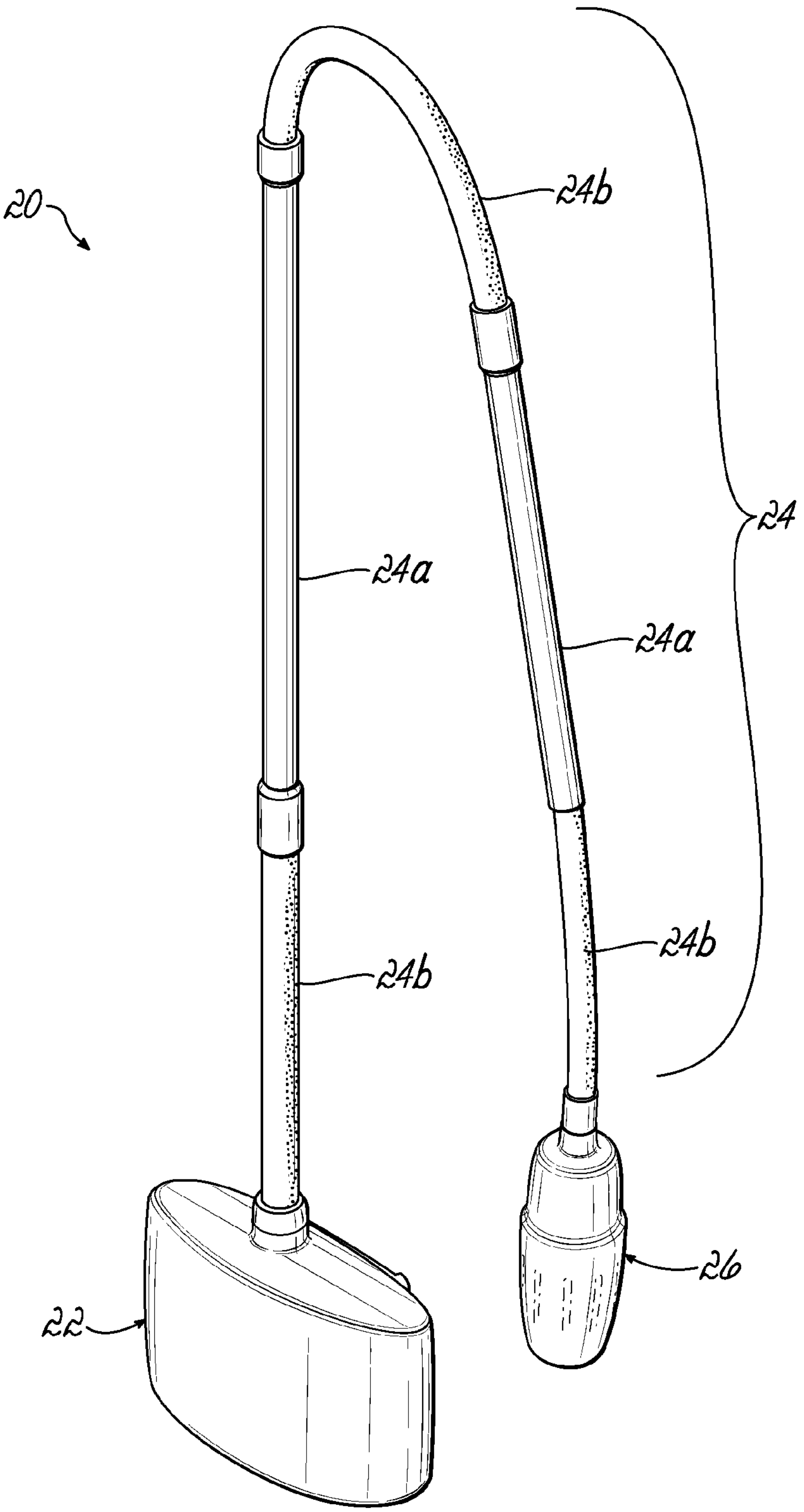
FIG. 1 is a perspective view of an embodiment of the exam light.

Turning now the embodiment of the examination light 20 in FIG. 1, the light 20 includes a base component 22, an arm 24 with both rigid 24*a* and flexible 24*b* sections, and a lamp head 26. The combination of rigid 24*a* and flexible 24*b* sections of the arm 24 assist in moving the lamp head 26 to various positions by the health care provider and assists the provider in directing the light toward the examination and/or treatment area on a patient. The base component 22 of the examination light 20 provides a mounting structure (not shown) which allows the light 20 to be mounted to an examination table, chair, or other fixture, such that the examination light 20 is available for use by the health care provider.

Figure 2:
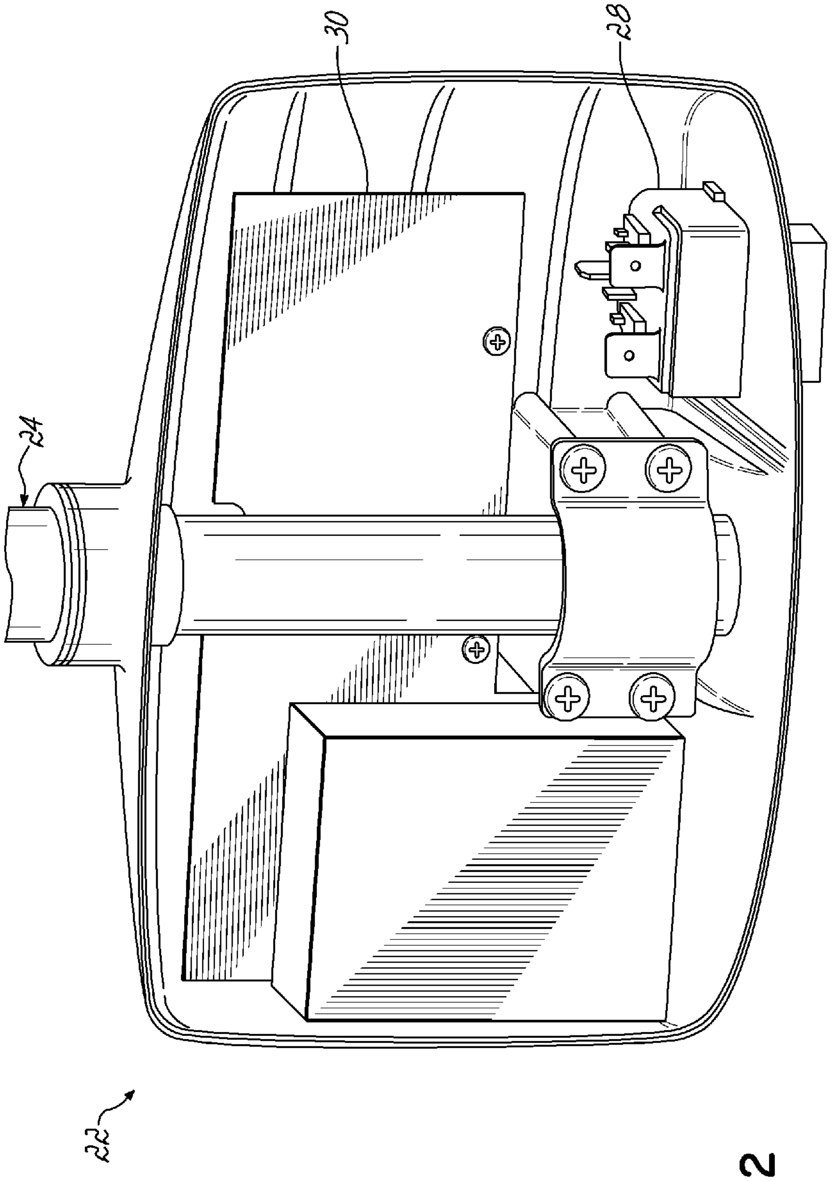
FIG. 2 is a detailed view of the base of the exam light in FIG. 1.

The examination light 20 is electrically powered through an electrical connection to an AC source in a wall socket or the like. As seen in FIG. 2, the source of electrical AC power enters the base component 22 at connection 28 which is in turn electrically connected to a circuit board 30. Components on the circuit board 30 convert the AC power to DC which is used to power the components in the lamp head 26. The DC power is delivered to the lamp head 26 through wires extending from the circuit board 30 through the arm 24. By placing the electrical conversion circuitry in the base component 22, any heat generated by that circuitry is located away from the health care provider and the patient.

Figure 3:
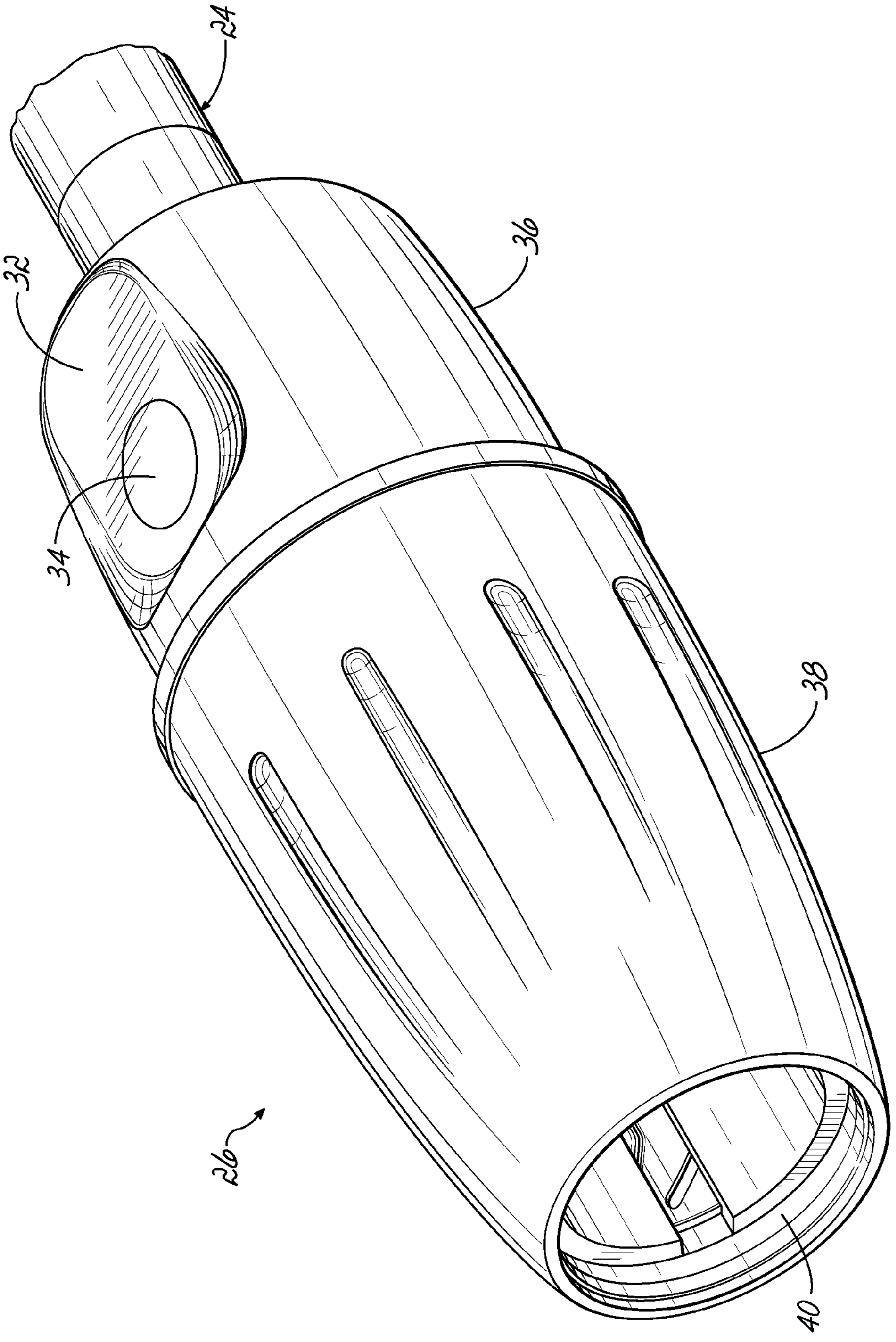
FIG. 3 is a detailed view of the head of the exam light in FIG. 1.

FIG. 3 provides additional detail for the lamp head 26. The examination lamp 20 is controlled by a control area 32 on the lamp head 26. In some embodiments, this control area 32 may include a single button 34 which may be used to turn the light 20 on, cycle through preset brightness levels, and turn the light 20 off. In other embodiments, multiple buttons 34 may be employed with one button being dedicated to turning the light 20 on and off and other buttons being used to adjust the brightness of the light 20. The control area 32 is located on a proximal portion 36 of the lamp head 26, which is coupled to the arm 24 and remains in a fixed position with respect to the arm 24. A distal portion 38 of the lamp head 26 rotates with respect to the proximal portion 36 in both a clockwise and a counter-clockwise direction. The rotation of the distal portion 38 may be limited in each of the clockwise and counter-clockwise directions by stops within the distal portion 38. Rotation of the distal portion 38 causes relative motion of components within the lamp head 26 to adjust the spot size of the light emitted from an exit aperture 40 of the lamp head 26.

Figure 4:
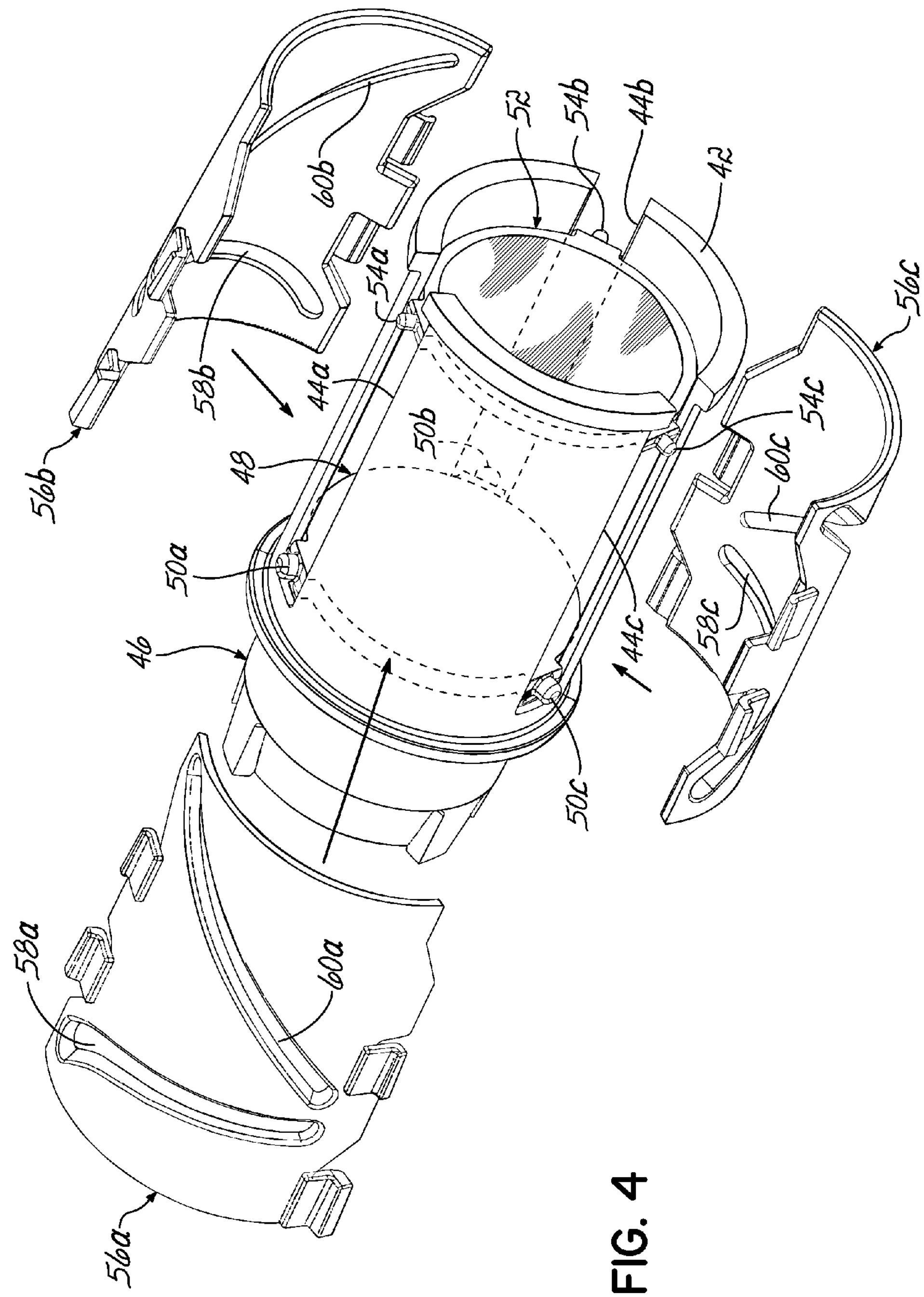
FIG. 4 is an exploded view of components of the head of the exam light in FIG. 3.

As seen in more detail in FIG. 4, a cylinder 42 with slots 44*a*, 44*b*, 44*c* is fixed to a housing 46 within the proximal portion 36 of the lamp head 26. A lens 48 is located within the cylinder 42 near the housing 46. Protrusions 50*a*, 50*b*, 50*c* extending from an edge of the lens 48 are aligned with the slots 44*a*, 44*b*, 44*c* within the cylinder 42 allowing the lens to move along an axis normal to the lens 48. A second lens 52 is also located within the cylinder 42 and distally from the lens 48. Protrusions 54*a*, 54*b*, 54*c* extending from an edge of the lens 54 are also aligned with the slots 44*a*, 44*b*, 44*c* within the cylinder 42 allowing the lens to move along an axis normal to the lens 52. Components 56*a*, 56*b*, 56*c*, illustrated in an exploded view in FIG. 4, contain slots 58*a*, 58*b*, 58*c* in which the protrusions 50*a*, 50*b*, 50*c* of lens 48 are also located. Components 56*a*, 56*b*, 56*c* are coupled with the distal portion 38 of the lamp head 26. As the distal portion 38 of the lamp head 26 are rotated, components 56*a*, 56*b*, 56*c* and their associated slots 58*a*, 58*b*, 58*c* and 60*a*, 60*b*, 60*c* are also rotated.

Figure 4A:
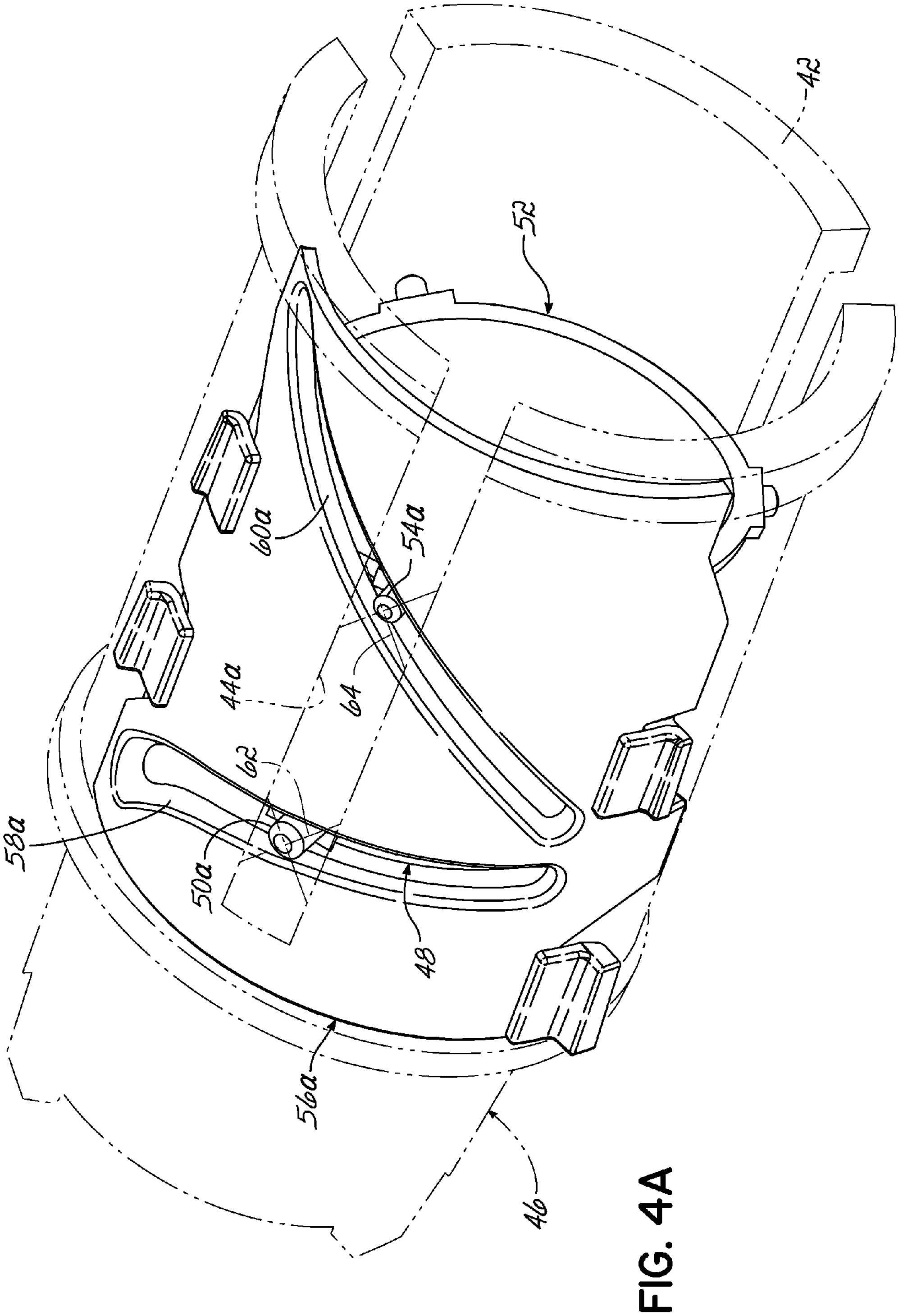
FIG. 4A is a detailed view of components in FIG. 4.

When assembled, slots 58*a*, 58*b*, 58*c* intersect slots 44*a*, 44*b*, 44*c* respectively. Similarly, slots 60*a*, 60*b*, 60*c* also intersect slots 44*a*, 44*b*, 44*c*. An example of theses intersections may be seen in the detailed view in FIG. 4A. Intersection 62 occurs where slot 58*a* of component 56*a* crosses slot 44*a* of cylinder 42. Protrusion 50*a* of lens 48 is positioned at intersection 62. The other protrusions 50*b*, 50*c* of lens 48 are positioned similarly in similar intersections (not shown). Additionally, intersection 64 occurs where slot 60*a* of component 56*a* crosses slot 44*a* of cylinder 42. Protrusion 54*a* of lens 52 is positioned at intersection 64. The other protrusions 54*b*, 54*c* of lens 52 are positioned similarly in similar intersections (not shown). As the components 56*a*, 56*b*, 56*c* are rotated, the intersection point moves along the slots 44*a*, 44*b*, 44*c* thus moving the lenses 48, 52 relative to one another.

Figure 5:
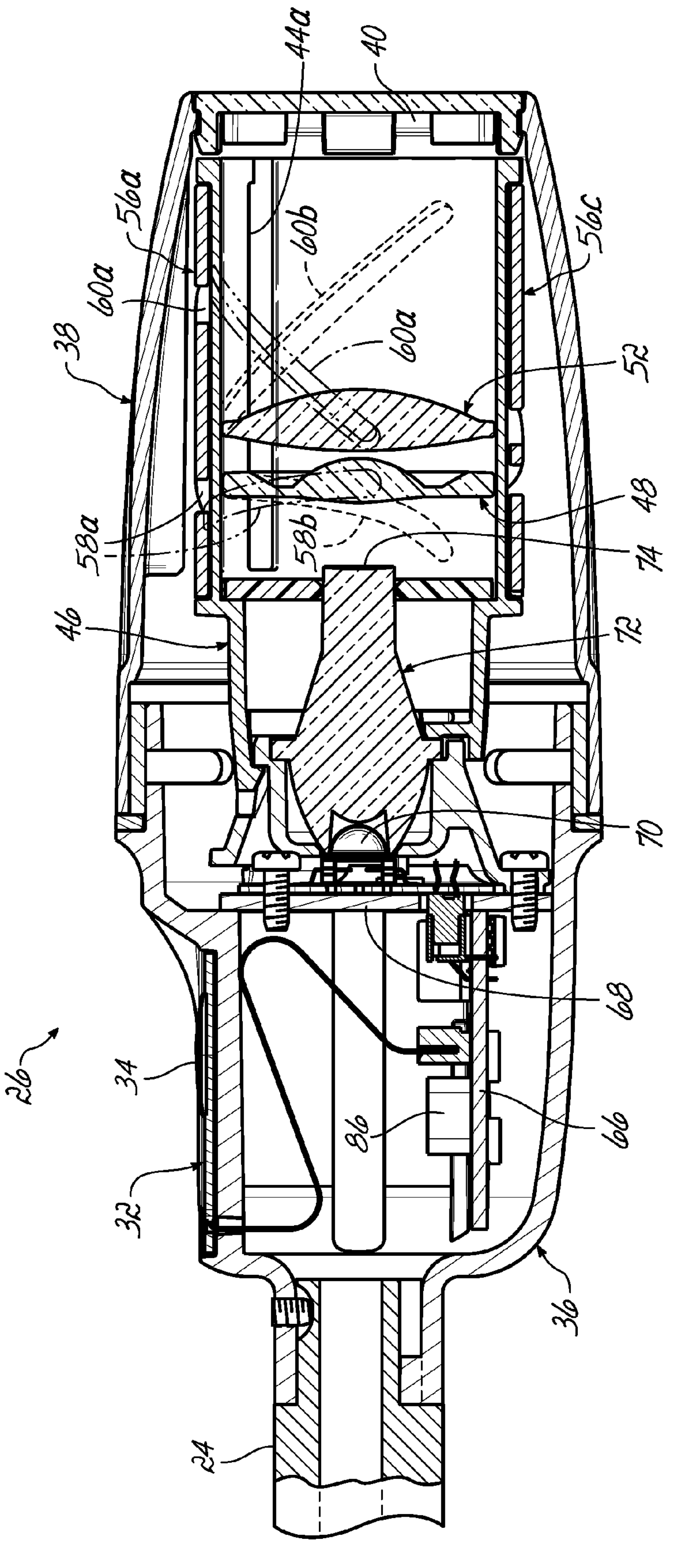
FIG. 5 is a cross section view of the head of the exam light in FIG. 3 with the optical lenses in a first position.

FIG. 5 shows a cross section of the lamp head 26 with the lenses 48, 52 in a first position at one of the extremes of the light. As can be seen in the cross section, DC power is delivered through arm 24 connected to the proximal portion 36 of the lamp head 26. Circuit board 66 receives the DC power (not shown) as well as control signals from the control area 32. Circuit board 66 also contains the drive controls for LED 70, the source of the light for the examination light 20. Circuit board 66 is connected to circuit board 68, which contains the LED 70 and a current sense resistor providing feedback to circuit board 66. Other embodiments may contain alternate configurations of the circuit boards with single or multiple boards being used. In multiple board embodiments, components may be distributed in many configurations. The drive controls on circuit board 68 drive LED 70 according to a desired output level. Light emitted from LED 70 is collected in mixing element 72. Light exits mixing element 72 at an exit face 74 and is directed toward both lenses 48, 52. Light is then magnified by lenses 48, 52 to generate the desired spot size.

Figure 6:
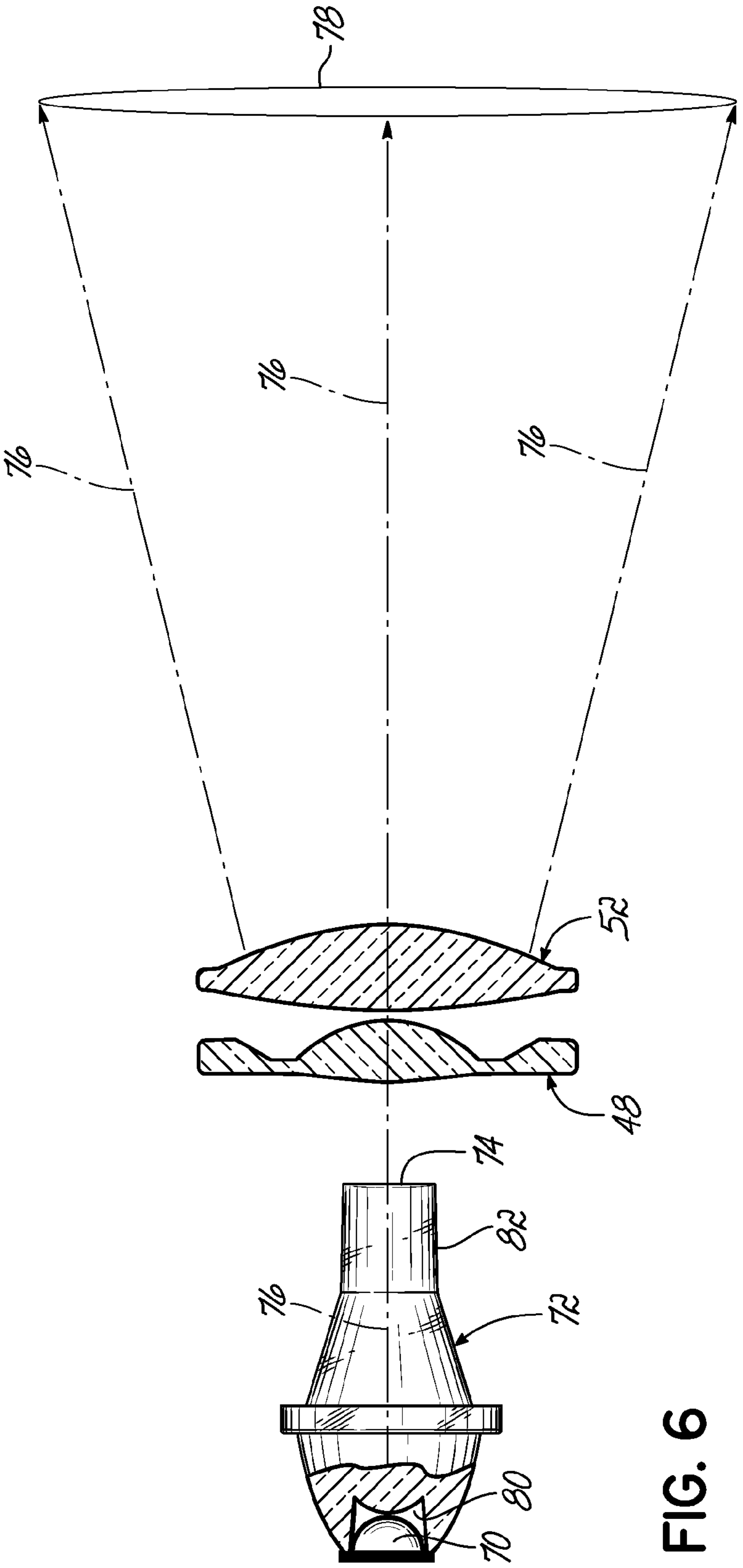
FIG. 6 is a detailed view of the optical elements in the position in FIG. 5

FIG. 6 illustrates the magnification of the light with the lenses 48, 52 in the position shown in FIG. 5. For clarity, only the optical elements are shown in FIG. 6. As can be seen in the figure, light rays 76 emitted from LED 70 are collected in mixing element 72 and directed from the exit face 74 first to lens 48. Light rays 76 are first magnified by lens 48 and while being directed to lens 52. Lens 52 further magnifies the light rays 76 resulting in a spot 78. In this configuration, spot 78 is at its maximum size (42 times magnification).

Figure 7:
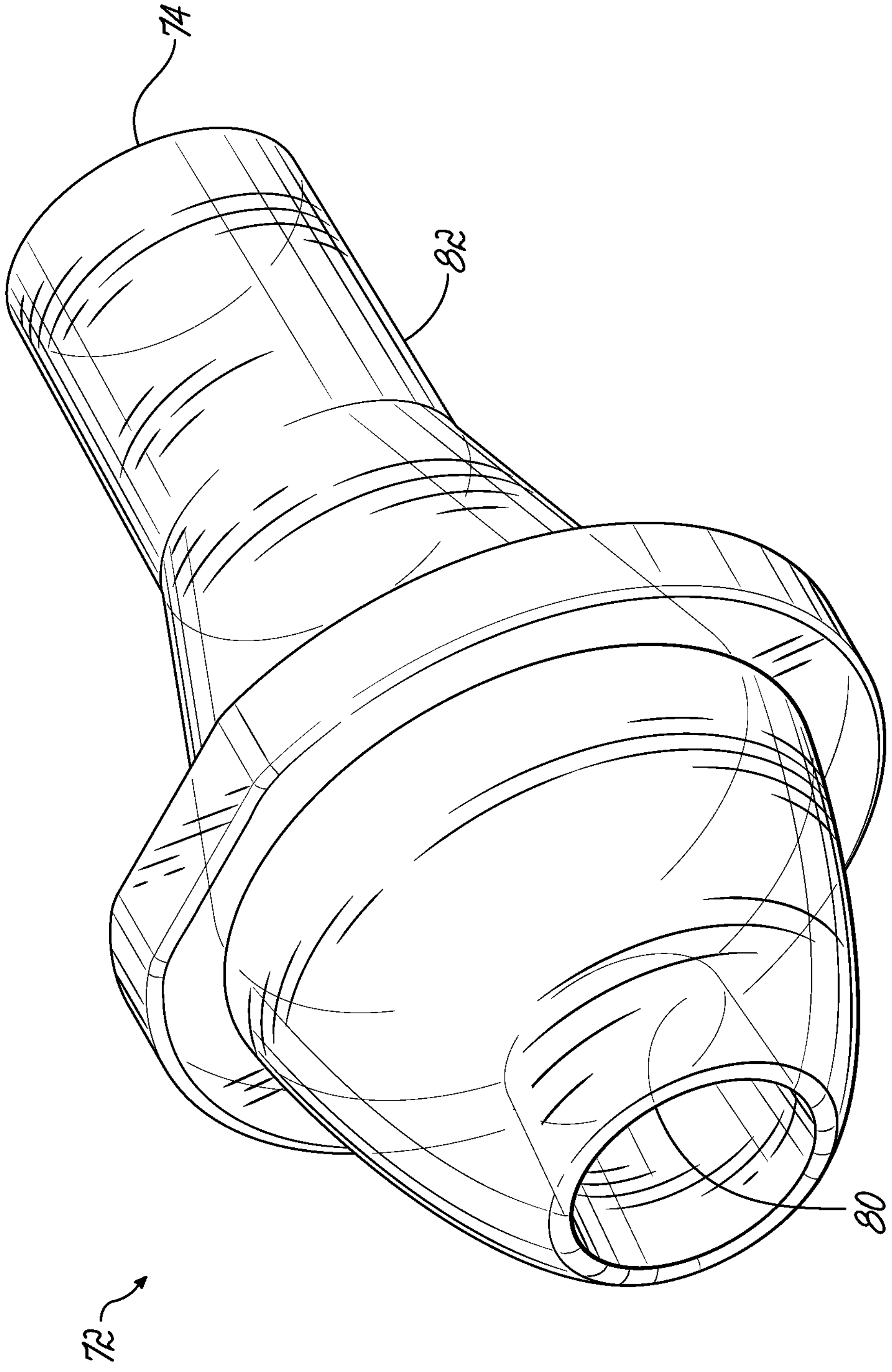
FIG. 7 is a detailed view of the optical mixing element in FIG. 6.

Specifically, and with reference to both FIGS. 6 and 7, light from the LED 70 (a Luxeon K2 in some embodiments, though other LEDs may also be used), which is encapsulated in a nearly hemispherical epoxy lens, is sent to an output face via refraction at a positive optical surface, followed by Total Internal Reflection ("TIR") at a parabolic initial phase 80 of the mixing element 72 and thereby via additional TIR along the cylindrical final stage 82 of the mixing element. Some of the emission from the LED 70 also proceeds directly without TIR to the output face 74, being affected only by the initial refractive surface.

The exit face 74 is then re-imaged via a 3:1 zoom lens (lenses 48, 52) to a constant final position. The zoom lens operates over a magnification range of approximately 14× to 42×. The zoom lens comprises the two positive acrylic optical elements, lens 48 and lens 52. A typical prescription of the zoom lens is attached in the appendix at the end of this disclosure.

Figure 8:
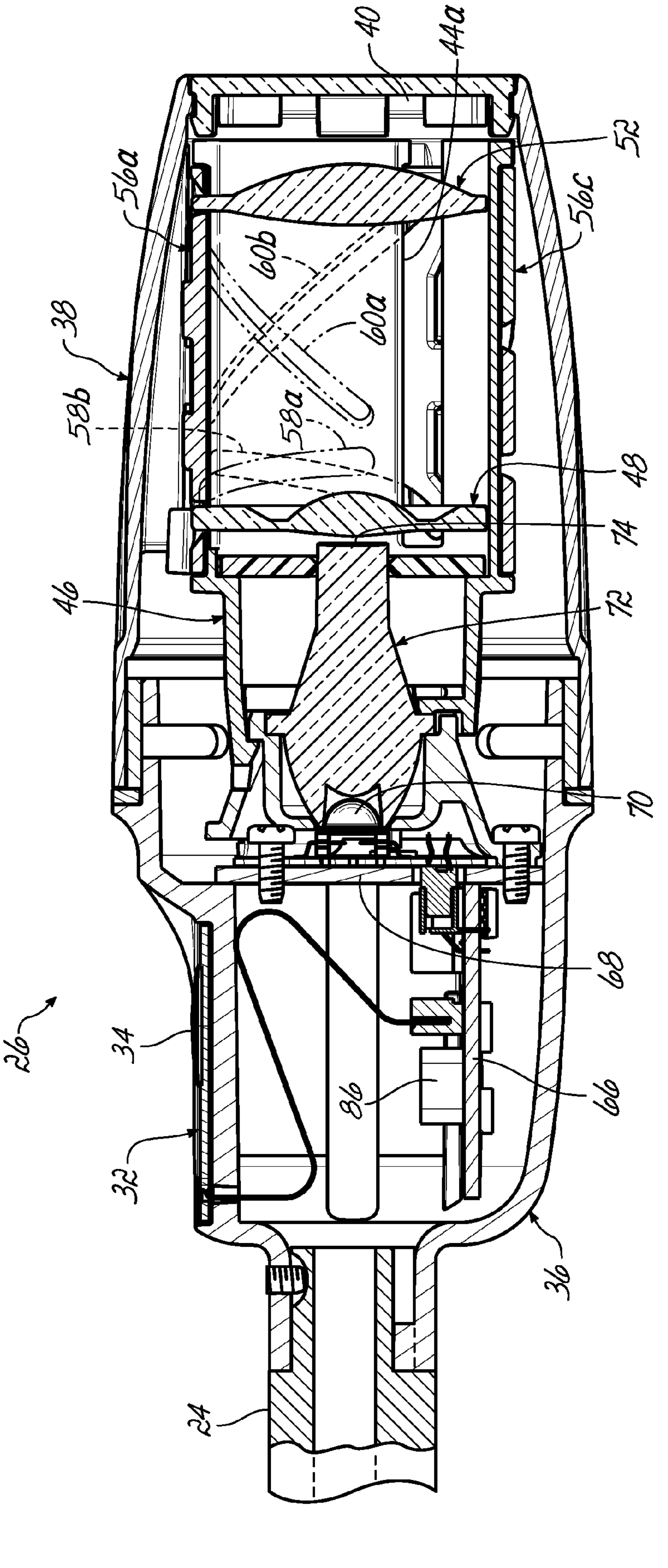
FIG. 8 is a cross section view of the head of the exam light in FIG. 2 with the optical lenses in a second position.
Figure 9:
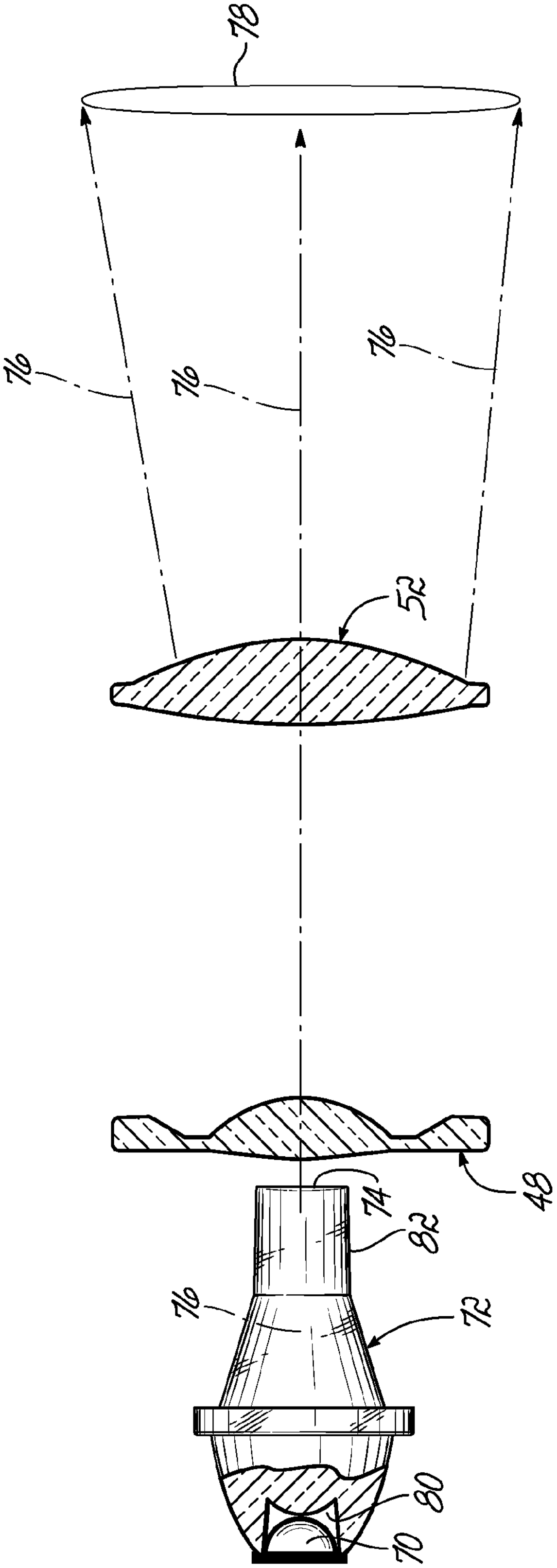
FIG. 9 is a detailed view of the optical elements in the position in FIG. 8.

FIG. 8 illustrates a cross section of the lamp head 26 with lenses 48, 52 at the opposite extremes. In this configuration, an as additionally seen in the simplified view in FIG. 9, light rays 76 from LED 70 are sent to the parabolic initial phase 80 of the mixing element 72 and thereby via additional TIR along the cylindrical final stage 82 of the mixing element. Light rays 76 then first magnified by lens 48 and while being directed to lens 52. Lens 52 further magnifies the light rays 76 resulting in a spot 78. In this configuration, spot 78 is at its minimum size (14 times magnification).

As the health care provider rotates the distal portion 38 of the lamp head 26 between the extremes illustrated in FIGS. 5, 6, 8 and 9, the lenses 48, 52 making up the zoom lens move towards or away from one another, thus adjusting the spot size 78 of the examination light 20. In some embodiments, masking elements may also be used with the optics to assist in controlling the spot size.

At a given distance from the exit aperture 40, and with a fixed light (i.e. LED 70) output, as the target spot size 78 is increased, the light density will generally decrease. Similarly, if the spot size 78 is decreased, the light density will generally increase. Therefore, embodiments of the invention include a controller that adjusts the brightness of the light 20 to maintain a constant light density as the spot size 78 of the light 20 is changed.

If the spot size 78 is known, the output from LED 70 could be increased or decreased appropriately to maintain a constant light density in the spot 78. The spot size is proportional to lens travel. Therefore, if the position of the lens is known, the spot size is known. This position can be used by a controller 84 to adjust the drive current of the LED, which in turn adjusts the light density.

The size of the spot is $\pi r^2$. Therefore, as the spot radius (i.e. r) is increased, the light density decreases as a squared function, since the same amount of light is spread over a larger area dictated by $r^2$. If the desired light intensity is achieved with an LED drive current $I_{min}$, at the smallest spot size, $r_{min}$, then a constant intensity may be achieved over any spot size (r) by setting the LED drive current (I) to:

$$I = I_{min}\left(\frac{r^2}{r_{min}^2}\right) \quad (1)$$

Figure 10:
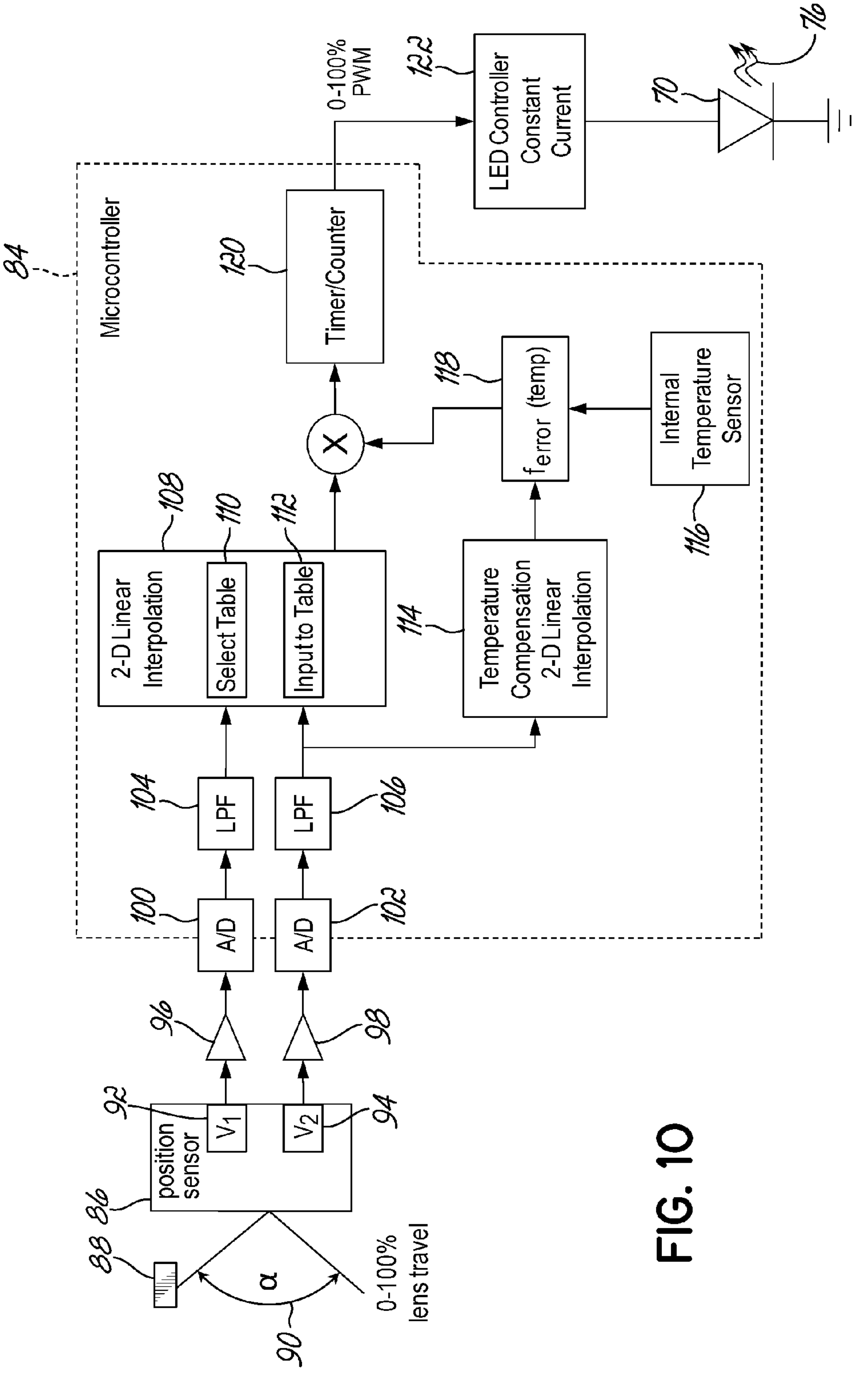
FIG. 10 is a block diagram of the components controlling the intensity of the light emitted from the exam light of FIG. 1.

Referring now to the block diagram in FIG. 10, the position of the lens is determined using a magnetic position sensor 86 mounted in a fixed position on circuit board 66 in the proximal portion 36 of the lamp head 26. A neodymium magnet 88 (or other permanent magnet) is mounted on the rotatable distal portion 38 of the lamp head 26. As the distal portion 38 is rotated, an angle 90 between the magnet 88 and the centerline of the sensor 86 is changed. The change may be reflected in dual outputs 92, 94 of the sensor 86. The outputs 92, 94 of the sensor 86 may be conditioned with instrumentation amplifiers 96, 98 and fed into two channels of the controller's 84 ND converters 100, 102.

Samples from the ND converters 100, 102 may be filtered with a single-pole, low-pass filter 104, 106. In some embodiments the A/D converters 100, 102 and low pass filters 104, 106 may be integral with the controller 84. In other embodiments, one or more of the ND converters 100, 102 or low pass filters 104, 106 may be separate from but in electrical communication with the controller 84. The filtered measurements may then be fed into a linear interpolation routine 108 that uses lookup tables to approximate non-linear functions. One A/D channel 100 may be used to select the appropriate lookup table 110, while the other channel 102 may be fed as the input (x-axis) 112 of the interpolation routine. In other embodiments, other methods of determining solutions to the non-linear functions may be used. An output of the interpolation routine 108 is a "boost" factor. The boost factor multiplies the nominal drive current (the current $I_{min}$ at the smallest spot size, $r_{min}$).

In some embodiments, the magnetic sensor may be temperature sensitive. This temperature sensitivity may also be dependent on the angle of the magnetic field. Therefore, one of the position A/D channels 100, 102 may be fed into another interpolation routine 114 that may also use a lookup table, with an output of this routine being the temperature sensitivity. A temperature of the circuit board 66 may be measured with a third A/D channel (not shown) and an internal temperature sensor 116, either inside the controller 84 or in other embodiments the temperature sensor may be located on the circuit board 66. The table sensitivity may be multiplied by the measured temperature and may be used to compensate the boost factor.

The raw boost factor from the position routine 108 may then be multiplied by the temperature error factor 118, and the nominal current $I_{min}$ may then multiplied by the corrected boost factor resulting in a final drive current, I. This final current is controlled via a duty cycle, 0-100%. The duty cycle is used to set a timer counter register 120 in the controller 84 to output a PWM driver to an LED controller 122. The LED controller 122 may be a constant current device, which is configured to set the maximum current with 100% duty cycle. Therefore, any duty cycle less than 100% proportionally reduces the drive current to the LED 70, and thus adjusts the intensity of the light 76 emitted from the LED 70, and thus may be used to keep the light density of the spot approximately constant.

While the present invention has been illustrated by a description of one or more embodiments thereof and while these embodiments have been described in considerable detail, they are not intended to restrict or in any way limit the scope of the appended claims to such detail. The various features shown and discussed herein may be used alone or in any combination. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

APPENDIX

Typical Prescription of the Zoom Lens

Zoom

Cycle Number = 0, Phi Value = 0.00E+00

Lens Data

| Surf No. | Type | Radius | Thickness | Glass | Clear Aperture Diameter |
|---|---|---|---|---|---|
| 1 | | ∞ | −1000.00000 | | 8.00 |
| 2 | | Aperture stop | 1000.00000 | | 700.00 |
| 3 | | ∞ | Space 1 | | 8.00 |
| 4 | ac | 24.0000 | 3.96000 | ACRYLIC | 10.50 |
| 5 | | −10.0000 | Space 2 | | 10.50 |
| 6 | ac | 135.0000 | 5.60000 | ACRYLIC | 19.70 |
| 7 | ac | −15.4000 | 413.00000 | | 19.70 |
| 8 | | ∞ | Image distance | | 400.00 |

Symbol Description a—Polynomial asphere
c—Conic section

Even Polynomial Aspheres and Conic Constants

| Surf. No. | k | D | E | F | G | H |
|---|---|---|---|---|---|---|
| 4 | −5.0000E+00 | 0.000000E+00 | 0.000000E+00 | 0.000000E+00 | 0.000000E+00 | 0.000000E+00 |
| 6 | 1.2000E+02 | 0.000000E+00 | 0.000000E+00 | 0.000000E+00 | 0.000000E+00 | 0.000000E+00 |
| 7 | −1.3000E+00 | 0.000000E+00 | 0.000000E+00 | 0.000000E+00 | 0.000000E+00 | 0.000000E+00 |

Variable Spaces

| Zoom Pos. | Space 1 T(3) | Space 2 T(5) | Image Distance | Focal Shift |
|---|---|---|---|---|
| 1 | 0.500 | 24.500 | 0.231 | 142.000 |
| 2 | 6.200 | 0.500 | 18.676 | 547.000 |

What is claimed is:

1. A light comprising:

(a) a base unit;

(b) an arm extending from the base unit; and (c) a lamp head coupled to the arm, the lamp head comprising:

(i) an LED configured to provide light based on an input drive current, (ii) an optical mixing element configured to collect the light produced by the LED, (iii) a zoom lens element configured to adjust an output size of a spot generated by the light collected in the mixing element, (iv) a rotary member, (v) a fixed member, wherein the rotary member is rotatable relative to the fixed member to adjust the linear position of the zoom lens element relative to the LED to thereby adjust the output size of the spot generated by the light collected in the mixing element, (vi) a sensor configured to sense the angular position of the rotary member relative to the fixed member, and (vii) a controller receiving DC power from the base unit through the arm, the controller configured to set the input drive current for the LED to control an output light density of the spot in response to an operator selected input, the controller further configured to adjust the output light density of the spot in response to a signal from the sensor indicating a change in the angular position of the rotary member relative to the fixed member.

2. The light of claim 1, further comprising:

electrical conversion circuitry in the base and operatively coupled with the lamp head;

the electrical conversion circuitry configured to convert electrical power from an AC power source to DC electrical power when the light is coupled with the AC power source.

3. The light of claim 1, further comprising a second lens element, wherein the zoom condition is related to a relative distance between the zoom lens element and the second lens element.

4. The light of claim 3, wherein the second lens element is fixedly secured relative to the fixed member, wherein the rotary member is operable to translate the zoom lens element longitudinally relative to the second lens element and relative to the fixed member.

5. The light of claim 1, wherein the arm comprises:

(i) a first rigid section, (ii) a second rigid section, and (iii) a first flexible section, wherein the first flexible section is longitudinally interposed between the first rigid section and the second rigid section.

6. The light of claim 5, wherein the arm further comprises a second flexible section, wherein the first rigid section is longitudinally interposed between the first flexible section and the second flexible section.

7. The light of claim 1, wherein the lamp head further comprises a user input feature operable to selectively activate the LED.

8. The light of claim 1, wherein the optical mixing element comprises a parabolic initial phase.

9. The light of claim 8, wherein the optical mixing element further comprises a cylindrical final stage distal to the parabolic initial phase.

10. The light of claim 1, wherein the LED and the optical mixing element are fixedly secured relative to the fixed member.

11. The light of claim 1, wherein the LED, the optical mixing element, the zoom lens element, and the rotary member are in coaxial alignment.

12. The light of claim 1, wherein the lamp head further comprises a magnet secured to the rotary member.

13. The light of claim 12, wherein the sensor is secured to the fixed member, wherein the sensor is responsive to positioning of the magnet in relation to the sensor to thereby sense the angular position of the rotary member relative to the fixed member.

14. The light of claim 1, wherein the sensor is further configured to sense temperature.

15. A method of operating a light, the method comprising:

(a) determining a drive current level for an LED to obtain a light density output of the light;

(b) adjusting a zoom lens in the light to adjust a spot size of the light, wherein the act of adjusting a zoom lens comprises rotating a rotary element relative to a fixed element;

(c) detecting a change in angular position of the rotary element relative to the fixed element;

(d) calculating a change in the drive current level for the LED based on the detected change in angular position of the rotary element to maintain the light density output; and (e) driving the LED with the changed drive current.

16. The method of claim 15, wherein the zoom lens comprises first and second lens elements and wherein adjusting the zoom lens comprises adjusting a relative distance between the first and second lens elements.

17. The method of claim 16, further comprising: detecting the relative distance between the first and second lens elements.

18. A light comprising:

(a) a base unit;

(b) an arm extending from the base unit; and (c) a lamp head coupled to the arm, the lamp head comprising:

(i) a light source configured to provide light based on an input drive current, (ii) a zoom lens element configured to adjust an output size of a spot generated by light emitted from the light source, (iii) a rotary member, (iv) a fixed member, wherein the rotary member is rotatable relative to the fixed member to adjust the linear position of the zoom lens element relative to the light source to thereby adjust the output size of the spot generated by the light emitted from the light source, (vi) a sensor configured to sense the angular position of the rotary member relative to the fixed member, and (vii) a controller configured to set an input drive current for the light source to control an output light density of the spot, wherein the controller is further configured to adjust the output light density of the spot in response to a signal from the sensor indicating a change in the angular position of the rotary member relative to the fixed member.

19. The light of claim 18, wherein the light source comprises an LED, wherein the lamp head further comprises an optical mixing element configured to collect the light produced by the LED.

* * * * *